US006856942B2

(12) United States Patent
Garnett et al.

(10) Patent No.: US 6,856,942 B2
(45) Date of Patent: Feb. 15, 2005

(54) SYSTEM, METHOD AND MODEL FOR AUTONOMIC MANAGEMENT OF ENTERPRISE APPLICATIONS

(76) Inventors: Katrina Garnett, 3085 Ralston Ave., Hillsborough, CA (US) 94010; Prashant Gupta, 1037 Franklin Ave., Monterey, CA (US) 93940; Robert Hagmann, 3953 Laguna Ave., Palo Alto, CA (US) 94306; James E. Van Riper, 104 Bordeaux La., Scotts Valley, CA (US) 95066

( * ) Notice: Subject to any disclaimer, the term of this patent is extended or adjusted under 35 U.S.C. 154(b) by 0 days.

(21) Appl. No.: 10/384,406

(22) Filed: Mar. 6, 2003

(65) Prior Publication Data

US 2004/0148138 A1 Jul. 29, 2004

(Under 37 CFR 1.47)

Related U.S. Application Data

(60) Provisional application No. 60/362,661, filed on Mar. 9, 2002.

(51) Int. Cl.[7] .............................................. G06F 19/00
(52) U.S. Cl. ...................... 702/183; 702/186; 709/223; 709/224
(58) Field of Search ................................. 702/183, 184, 702/185, 186; 709/223, 224

(56) References Cited

U.S. PATENT DOCUMENTS

| 6,108,700 | A | | 8/2000 | Mills et al. | |
|---|---|---|---|---|---|
| 2002/0174207 | A1 | * | 11/2002 | Battou | 709/223 |
| 2004/0046785 | A1 | * | 3/2004 | Keller | 345/734 |
| 2004/0049365 | A1 | * | 3/2004 | Keller et al. | 702/186 |
| 2004/0049372 | A1 | * | 3/2004 | Keller | 703/22 |
| 2004/0049500 | A1 | * | 3/2004 | Donatelli et al. | 707/3 |
| 2004/0049509 | A1 | * | 3/2004 | Keller et al. | 707/100 |
| 2004/0049565 | A1 | * | 3/2004 | Keller et al. | 709/223 |
| 2004/0059810 | A1 | * | 3/2004 | Chess et al. | 709/224 |
| 2004/0059966 | A1 | * | 3/2004 | Chan et al. | 714/48 |
| 2004/0060054 | A1 | * | 3/2004 | Das et al. | 719/310 |
| 2004/0103338 | A1 | * | 5/2004 | Chalasani et al. | 714/4 |
| 2004/0103339 | A1 | * | 5/2004 | Chalasani et al. | 714/4 |
| 2004/0122950 | A1 | * | 6/2004 | Morgan et al. | 709/226 |

OTHER PUBLICATIONS

Elarde, J.V. et al., "Performance Analysis of Application Response Measurement (ARM) version 2.0 Measurement Agent Software Implementations", Performance Computing, and Communications Conference, 2000, IPCCC 2000. Conference Proceeding of the IEEE International, Phoenix, AZ, USA, IEEE, US, Feb. 20, 2000, pp. 190–198, XP010500025, ISBN: 0–7803–5979–8.
International Search Report, International Application No.: PCT/US2004/007020, Oct. 12, 2004, pp. 1–2.

* cited by examiner

*Primary Examiner*—Patrick J. Assouad
(74) *Attorney, Agent, or Firm*—Fish & Richardson P.C.

(57) ABSTRACT

Methods, apparatus and system programs are provided for holistic monitoring and troubleshooting an application where the application functionally depends upon a plurality of components on a network system and at least one of the plurality of components being selected from a group consisting of a network component, a hardware component, and a software component. The method includes collecting data from the components and analyzing data collected from the components to discover one or more issues in the components. The analyzing step includes considering domain knowledge of the components and considering the interrelationships and correlations between components working within the application. The method function includes diagnosing the issues in the components to determine an action plan.

90 Claims, 2 Drawing Sheets

SYSTEM, METHOD AND MODEL FOR AUTONOMIC MANAGEMENT OF ENTERPRISE APPLICATIONS

CROSS-REFERENCE TO RELATED APPLICATIONS

This application claims the benefit of U.S. Provisional Application No. 60/362,661 filed on Mar. 9, 2002.

BACKGROUND

The present invention generally relates to management of applications.

Enterprises can use distributed systems comprised of many applications to carry out day-to-day operations. Applications in the distributed systems can themselves be distributed and spread across many computers connected by a network. Such distributed systems have proven successful in providing enterprise users with effective processing of large amounts of data in a short duration of time.

Although distributed applications provide efficient and powerful tools to an enterprise, the complexities, and intricacies of the distributed architecture make the integration and operations of such applications very difficult. Enterprises have addressed application integration issues by using Enterprise Application Integration (EAI) platforms. EAI platforms have been used for the integration of Customer Relations Management (CRM), Supply Chain Management (SCM), Enterprise Resource Planning (ERP) and many other large and important applications of an enterprise. Once integrated, such large and complex applications are equally difficult to manage. Indeed, once an application is deployed on a distributed system, it becomes extremely difficult to judge where the bottlenecks of the application may be located and how to "troubleshoot" the same.

The issues of integration and management of applications have been further exacerbated due to the emergence of electronic business (often called e-business). With the emergence of the Internet and with advances in wired as well as wireless communications, there has been a revolutionary change in business dynamics, as a result of which, many operational boundaries between enterprises have virtually become non-existent. Further, emergence of e-business has facilitated business collaborations wherein enterprises exchange real-time product, services, and market information with their partners, manufacturers, suppliers, transporters, and customers. As expected, such collaboration, interoperability and integration of various applications usually leads to a much harder task of identifying, analyzing and troubleshooting issues related to components and improving enterprise's efficiency.

It is therefore very important for enterprises to not only integrate large applications, but effectively manage them as well because even a small inefficiency in an application can result in tremendous economic and operational loss for the enterprise. For instance, a minor inefficiency in an ERP application can have a tremendous impact on the operation of the entire business of an enterprise. An ERP application not only impacts the way companies do business, but also impacts the productivity of a large number of employees using these applications, which in turn is largely dependent on other computational components.

Enterprises have relied on a combination of skilled human administrators and a plethora of application management tools for regularly monitoring and debugging issues associated with the components that comprise their applications.

SUMMARY

Since human administrators are costly, both in terms of time and money, a system is provided that includes tools for autonomic management, monitoring and troubleshooting of enterprise applications. Such tools provide an automated mechanism to test, track and report the availability and the condition of various enterprise applications. These tools also aid in maximizing the performance and make the enterprise system coherent.

In another aspect, a system, method and computer program is provided to deliver an end-to-end performance management solution for enterprise applications and systems comprised of networks of enterprise applications. The system, method and computer program regularly monitors applications, detects faults and troubleshoots the same. The system, method and computer program goes beyond managing individual applications and takes into consideration the relationships and dependencies among all the components internal and external to the applications as well as the use or style of use of the component within the application. The system, method and computer program also takes into consideration the interrelationship of components within the application, correlation between components, and other information, knowledge, structure, logic, or behavior that is a result of using a component within the application, thus providing for holistic management of the entire system.

A coordinated set of techniques for querying, probing, measuring, analyzing, baselining and troubleshooting is provided. The system is able to identify and describe a set of possible issues and is able to rectify and/or notify the user accordingly. In this way the system significantly reduces the time it takes to find and fix issues and it prevents many issues from even occurring. Such an integrated and automated approach for solving application performance issues results in significant reduction in the total cost of ownership for the enterprises.

BRIEF DESCRIPTION OF DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

The present invention relates to a system, method and computer program for monitoring and troubleshooting applications in a computing environment. An issue is an event that affects the performance of any hardware or software component within the applications. If any issue is encountered, the system may take corrective actions like repairing the problem or tuning the system to make sure that desired performance level is achieved. The system, method and computer program regularly monitors the applications to automatically and preemptively identify any performance issues. The system, method and computer program takes an integrated approach to find the cause of the issues, by understanding the inter-relationships between various applications, and automatically suggests corrective measures and optimization and control strategies for such issues. In some cases, the system, method and computer program may also automatically repair the issues in applications.

Figure 1:
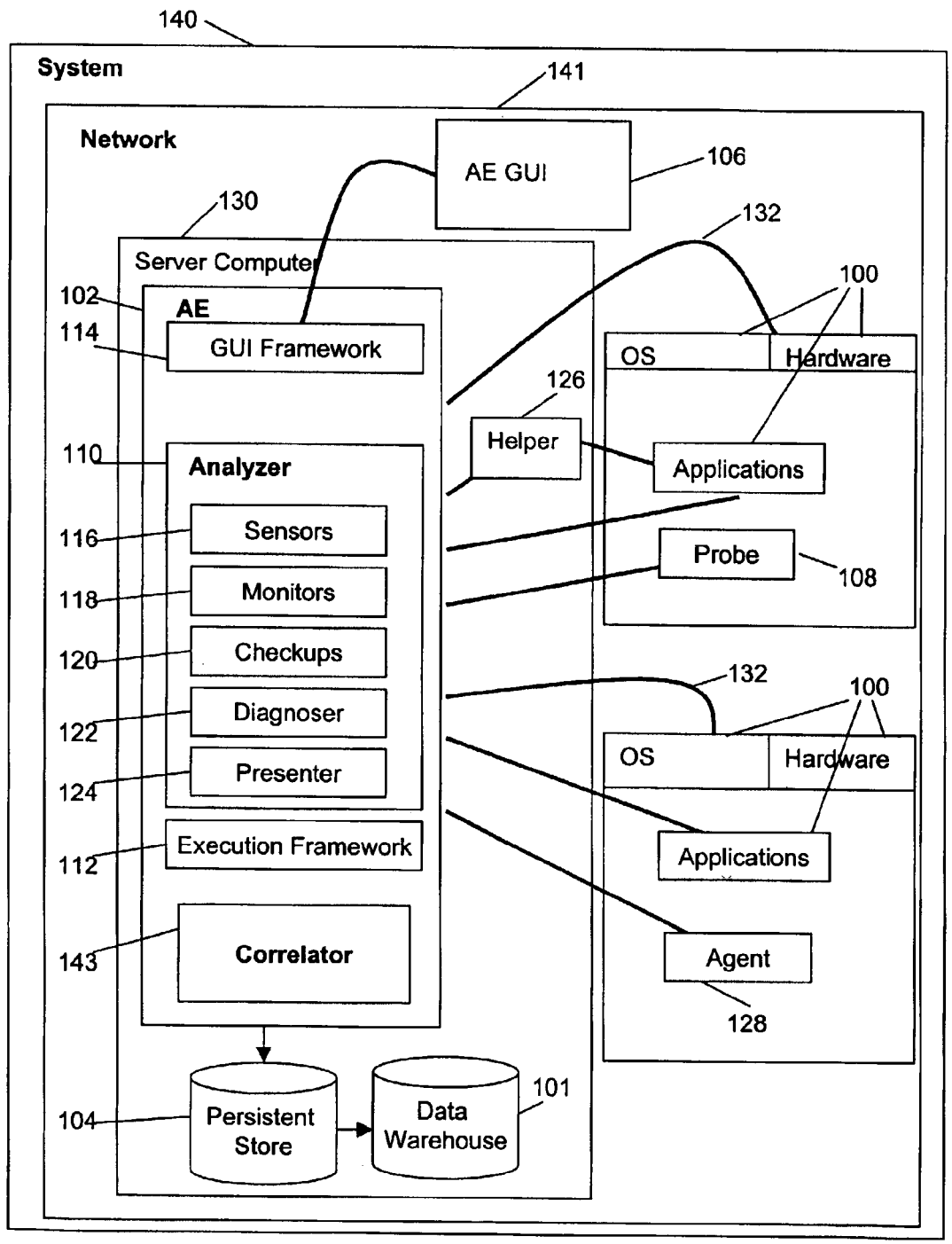
FIG. 1 is a block diagram that illustrates co-operation between elements of a holistic monitoring system.

FIG. 1 is a block diagram that illustrates co-operation between elements of holistic monitoring system 140. Referring to FIG. 1, the elements of system 140 are monitored components 100, an Autonomic Engine (AE) 102, a Persistent Store (PS) 104, a data warehouse 101 and an AE Graphical User Interface (GUI) 106.

Monitored components 100 include network components such as routers, WAN links, gateways, hubs, subnets and/or software and hardware components such as client hosts, server hosts, Operating Systems (OS) and applications running on them, that are spread across the network 141. All these monitored components 100 are monitored by AE 102. Monitored components 100 can also be grouped together to be managed by a correlator 143. Correlator 143 is a unified computational view that comprises logical topology and interrelationships between the monitored components 100 and a given correlator 143.

In one embodiment, AE 102 is a multi-threaded process and a logically centralized element that resides on a server computer 130. The system 140 can have a set of AEs 102 that coordinate to cover all the individual monitored components 100 and group of monitored components 100 that are to be collectively managed. Upon initial use, after deployment or upon selection by a user, AE 102 performs an automatic topology and component discovery process of the overall system that is to be monitored. Such a topology discovery process includes discovering the network topology, hosts, Operating Systems (OS) as well as the applications and services running on these hosts.

AE 102 can discover the network topology using protocols such as Simple Network Management Protocol (SNMP) and networking components such as routers and switches. AE 102 can discover hosts by using their Name Servers or by capturing Internet Protocol (IP) packets. The hosts are then contacted via protocols such as Telnet, and thereafter, commands are used to discover the operating system of the host. AE 102 can also read relevant files on the hosts to discover the applications that have been automatically started on the host. All the discovered data is stored in PS 104.

AE 102 is administered using GUI 106. Multiple instances of the GUI 106 can be active at the same time. Through the GUI 106, monitoring parameters like the choice of hosts, the services to be included within the scope of monitoring, timer values, Service Level Agreement (SLA) thresholds and method of alert notification (pager, email, or via the GUI) are configured. All these configurations can be viewed in a tabular as well as graphical form.

AE 102 further includes of a set of analyzer 110 elements, a set of correlator 143 elements, an execution framework 112, and a GUI framework 114. Corresponding to each monitored component 100 monitored by AE 102, is an analyzer 110 element within AE 102. Corresponding to each relevant combination of monitored components, such as an application, is a correlator 143 element.

Analyzer 110 is a software "object" that comprises various sub-elements including a set of sensors 116, a set of monitors 118, a set of checkups 120, a set of diagnosers 122 and a presenter 124.

A correlator 143 is another element in AE 102 that can have the identical internal structure as an analyzer 110. In software terms, correlator 143 can be a specialization of an analyzer 110. Correlator 143 is software code that embodies the overall application specific knowledge, i.e., how the components in an application interact with each other. For instance, in an enterprise application comprising Siebel and Oracle, correlator 143 for Siebel would have knowledge of networks, databases, web servers, and other components that operate within a Siebel execution context. Further, correlator 143 for Siebel would also have the knowledge of the frequent queries that are expected when Siebel interacts with a component like Oracle. Analyzer 110 and correlator 143 are different in that analyzer 110 relates to some software or hardware component, while correlator 143 relates to a collection of components such as an Enterprise application together with its supporting infrastructure.

The sub-elements of analyzer 110 and correlator 143 are described below. Sensors 116 are the sub-elements of analyzer 110 that interact with a monitored component 100 to gather performance data, configuration data and status data. The kind of data required by sensors 116 varies from one monitored component 100 to another. For instance, routers could be queried to determine their connections to their neighbors, their queuing algorithms and their buffer size. While, databases could be queried to determine buffer pool size, segment size and concurrent number of users. Hosts could be queried to determine their memory size, processor speed, type of processor, number of processors, virtual memory size, and patches. Similarly, enterprise applications could be queried for their configuration parameters.

Each monitored component 100 has a specific manner in which an external element may interact with it. Sensors 116 can be code or protocol that interacts with a monitored component 100 in the required manner. Thus, if a component 100 only provides a library callable from C in a single threaded process, then its sensor 116 accesses the component 100 in C from a single threaded process. Similarly, to access an OS like Solaris, and associated sensor 116 could run Solaris specific commands like "vmstat", "iostat", "mpstat" and "sar" to access the performance and other relevant data from Solaris.

Sensors 116 access monitored components 100 in one of three ways: directly 132, via a "helper" process 126, or via an "agent" process 128.

To directly 132 access monitored components 100, sensors 116 use various distributed computing techniques. If sensor 116 is unable to directly access a monitored component 100 due to reasons such as threading, library linking, security or connection management, sensor 116 can use a helper process 126. In this case, sensor 116 communicates with helper process 126, and helper process 126 in turn communicates with a monitored component 100. Helper process 126 resides on the same server platform 130 as AE 102 and can be started by AE 102. Alternatively, sensors 116 may also use agent process 128 to communicate with monitored components 100. Agent process 128 reside on the same host as a given monitored component 100, and can be configured to communicate with all monitored components 100 on their respective hosts.

A special kind of agent process 128, used only for monitoring network health, is a probe 108. Probes 108 are software code deployed at various places, like workstations and servers, for monitoring network traffic and/or for introducing network traffic. The position of probes 108 depends on the type of data that is required to be monitored. For instance, in case Wide Area Network (WAN) link traffic is to be monitored, probes 108 are positioned near the WAN link. Similarly, if external Internet traffic is to be monitored, probes 108 are positioned near the Internet access points. A system 140 may have multiple probes 108 that work in conjunction with each other to monitor the network traffic.

Probes 108 can perform network monitoring actively or passively. While actively monitoring, probes 108 receive and inject packets into the network to determine the networks' performance, topology, availability and other characteristics. Probes 108 can also initiate application transactions to support activities like, diagnostics or Service Level Agreement (SLA) computation. Further, probes 108 can send out echo packets to simulate "ping" and "trace route" functions. In addition, a throughput test may also be performed by probes 108 in which a burst of traffic of known size is sent and the time this traffic takes to arrive at its destination is determined. While passively monitoring, probes 108 only receive packets from the network and report to AE 102.

Probes 108 can also be configured by AE 102 to watch for certain kinds of "flows". When a new flow is seen that matches a predefined pattern, the flow is reported to AE 102. One kind of flow can be the communication for a particular application. Flows have a particular structure and protocol and can be "parsed" to determine the activity being performed by the given monitored component 100. A single probe 108 can monitor the flows of multiple monitored components 100.

After gathering the required data, probes 108 conduct primary analysis and construct higher-level semantics. The data can be summarized to include such items as the number of packets, total number of bytes, estimates of packet loss and round trip time.

All the data collected by sensors 116, either directly or through helper process 126 or agent process 128 (including probes 108) can be stored in PS 104. Further, automatically or upon direction from an administrator, the data of various monitored components 100 can be saved over regular intervals of time. This is termed as baselining and these baselines can be used later for troubleshooting. Monitors 118 are the sub-elements of analyzer 110 that perform sampling and first level analysis of the gathered data. Monitors 118 are an optional element of analyzer 110 when configured as a correlator 143, but are mandatory when the analyzer 110 is connected to a monitored component 100.

First level analysis performed by the monitors 118 typically involves testing if any threshold limits have been exceeded. Each monitor 118 runs periodically according to a set schedule and stores its own set of data in PS 104.

The data obtained by the first level analysis is further analyzed for discovering any issues in the performance of the monitored components 100. Analysis is performed by checkups 120. Checkups 120 are sub-elements of analyzer 110 and correlator 143 and perform second-level analysis. There are various forms of second-level analysis. One form of analysis involves computing various minimum, maximum, average values over a time period. Another form of analysis combines various probes 108 data to determine monitored components 100 response time for a user request. Yet another form of analysis compares the current state of a particular monitored component 100 against a stored baseline. Yet another form of analysis is directed towards network routing whereby the network traffic can be monitored to determine if broadcast storms, excessive retries, or excessive redirections are occurring.

The analysis of the data may reveal a violation of some condition against a stored baseline or a Service Level Agreement (SLA). In such a case, an alert is generated that prompts the system 140 about an issue. These alerts act as stimuli to activate diagnoser 122. Other stimuli that can activate diagnoser 122 include a user request whereby the AE 102 is requested to look at a particular monitored component 100, an alert like a Simple Network Monitoring Protocol (SNMP) trap or an entry in the OS event logs that has been parsed and processed. Diagnoser 122 can also be activated periodically to check for any issues that may be building in various monitored components 100.

Upon receiving stimuli, AE 102 start troubleshooting the issue by defining the scope of the issue. Thus, if a component 100 has an issue, then AE 102 identifies all the analyzers 110 and correlators 143 that directly or indirectly contain the monitored component 100 that is associated with the issue.

Diagnoser 122 can be a software code that incorporates the codified knowledge of professionals that know how to troubleshoot and repair a particular monitored component 100 in the form of knowledge modules. For instance, the knowledge of an engineer who is an expert in a packaged application like Siebel is tapped and codified into knowledge modules for that application. Similarly, the knowledge of a database administrator who specializes in databases for a particular packaged application is tapped and codified into knowledge modules for that packaged application. Diagnosers 122 contain knowledge modules that comprise many algorithms for troubleshooting and repairing, called tasks. Each task deals with a particular type of issue. Each task attempts to assess if some part of the monitored component 100 or some combination of monitored components 100 are working correctly. Each task requires performance data that may have already been acquired by earlier analysis to find and fix issues related to monitored components. Analyzer 110 for a particular monitored component 100 can have a set of tasks that pertain to the issues of that particular monitored component 100 in the corresponding diagnoser 122. Similarly, correlator 143 also has a set of tasks where some of these tasks deal in part with a particular monitored component 100. Diagnoser 122 tasks can be grouped into a set of categories together based on the type of issues they troubleshoot. These categories can be specific to the type of analyzer 110 or correlator 143, but there is a great deal of commonality. A particular diagnoser 122 task might fit into a multiple categories. For instance, display units would only have issues relating to their hardware circuits or Cathode Ray Tubes (CRTs), and hence the categories of display units would be those dealing with these specific issues. Similarly, modern routers typically do not have disk Input/Output (I/O), and hence the diagnoser tasks for a modern router would not have a category for Disk I/O.

Upon initiation by AE 102, tasks are "fired" that correspond to the categories of the analyzer 110 and/or correlator (s) 143 within the scope of an issue. The execution framework 112 in the AE 102 can run the tasks concurrently. The data gathered from the tasks by diagnosers 122 is analyzed using such techniques as "Expert Systems", "Case Based Reasoning", rule systems, modeling, differences between systems, and baselining with predictive modeling to identify one or more root causes of the issue.

Once diagnoser 122 identifies a root cause of an issue, the issue can be stored in PS 104. Diagnoser 122 can take one of the three actions. First, diagnoser 122 may fix the issue related to the component automatically, which we refer to as corrective action. Second, diagnoser 122 may alert the user for repair by proposing a method to automatically fix the issue, which we refer to as prescriptive. If the user accepts the proposed method, diagnoser 122 repairs the issue related to the monitored component. Finally, if diagnoser 122 cannot automatically repair the issue, diagnoser 122 displays a characterization of the issue and/or a recommended solution to the user in GUI 106. In any case, diagnoser 122 can notify the user about the issue using GUI 106. Additionally, diagnoser 122 may also use other notification techniques such as such as pagers and email.

To display results, diagnoser 122 uses presenter 124. Presenter 124 is a sub-element of analyzer 110. Presenter 124 uses GUI Framework 114 to support the display of different kinds of data, configuration, and alerts.

While the above discussion has dealt with the near-real-time behavior of the system, in addition there is long-term analysis. The data within the database can be loaded into data warehouse 101 or another analysis system, and there have further computation performed.

As correlator 143 is a specialization of analyzer 110, much of the above discussion applies directly to correlators 143. However, there are some important differences.

Monitors 118 are an optional element of analyzer 110 when it is configured as correlator 143, but are mandatory when the analyzer 110 is connected to a monitored component 100.

Correlators 143 have a similar structure as analyzers 110, but they interact with applications or other coherent groups of components. Correlators 143 use the facilities of a group of analyzers 110 for a given application to acquire performance, configuration, and other data, either through sensors 116 or through their access to the PS 104. Correlators 143 have their own monitors 118 (but they are usually omitted), checkups 120, and diagnosers 122. Correlators 143 deal with the entire application, in a holistic fashion. Correlators 143 use knowledge of the use or style of use of a monitored component 100 within the application, the interrelationship of components 100 within the application, correlation between components 100, and other information, knowledge, structure, logic, or behavior that is a result of using the component within the application. When diagnosers 122 find issues they also can send a prescriptive message or perform a corrective action, and similarly use the GUI 106 for notification.

Overall, system 140 is operative to manage and monitor the monitored components 100 individually, as well as with applications and their respective monitored components 100. In addition, the system 140 categorizes issues, produces prescriptive messages, and/or affects repair, tuning, restart, or other changes to the applications or monitored component 100.

Figure 2:
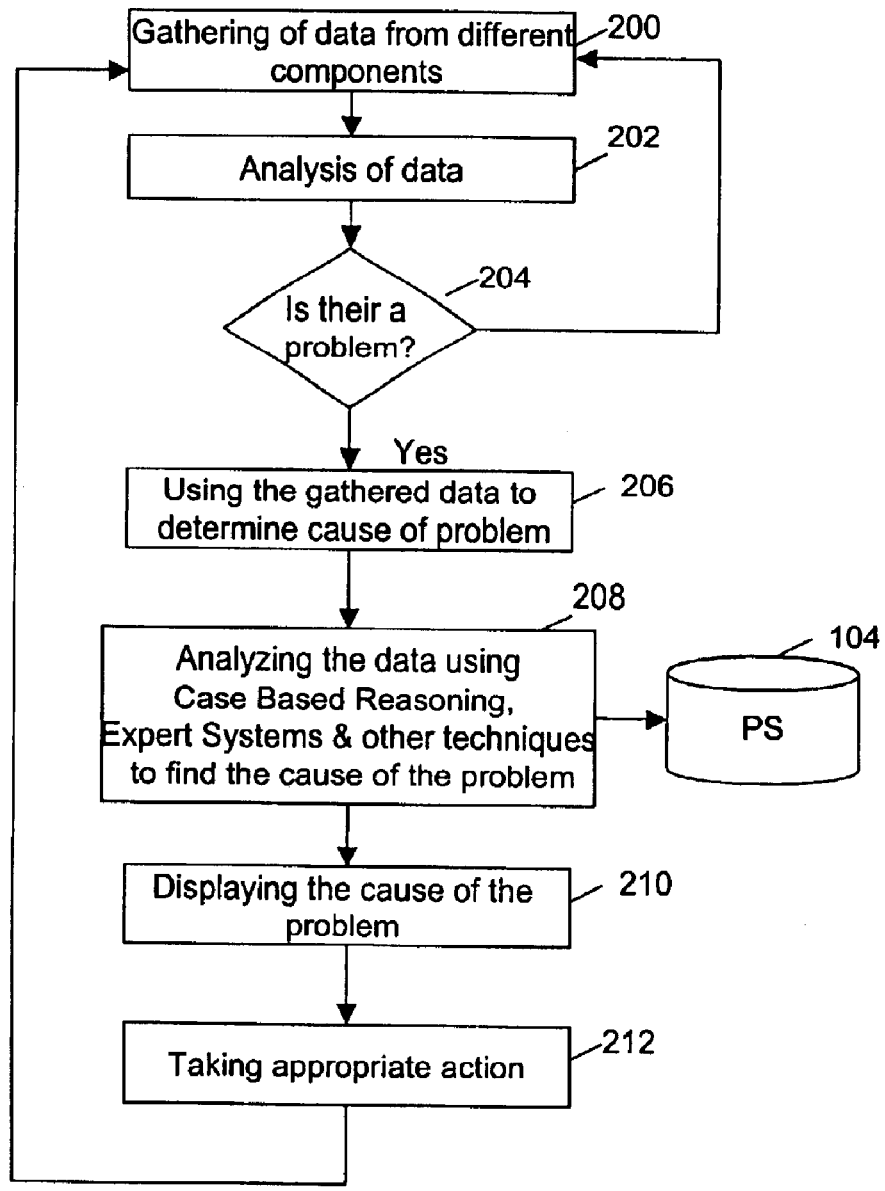
FIG. 2 is a flowchart that illustrates the steps involved in performing holistic monitoring and troubleshooting of components by the system.

FIG. 2 is a flowchart that illustrates the steps involved in performing holistic monitoring and troubleshooting of components by the system. Referring to FIG. 2, data from various components is gathered at 200 by, for example, sensors 116, and analyzed at 202, by, for example, monitors 118 and checkups 120. Data is then checked for any potential issues or disruption of Service Level Agreements at 204. If an issue is discovered in any component(s), tasks (e.g., diagnoser 112 tasks) are fired that are associated with the monitored components 100 and categories of the issue. Diagnosers 112 can use the data from sensors 116, monitors 118, and checkups 120 to determine the cause of the issue at 206. Diagnosers 112 can analyze the data using such techniques as "Expert Systems", "Case Based Reasoning", modeling, differences between systems, and baselining with predictive modeling to find the one or more causes of the issue at 208. Once the cause of the issue is identified, it can be stored in PS 104. The cause of the issue can be displayed at 210 to the user using, for example, the presenter at 216.

Thereafter, an appropriate action can be taken at 212, by, for example, diagnosers 122. Diagnosers 122 can either fix the issue related to the component automatically, or display a recommended solution to the user in GUI 106. Diagnosers 122 may also use other notification techniques such as pagers and email.

While embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for holistic monitoring and troubleshooting an application, the application functionally depending upon a plurality of components on a network system, at least one of the plurality of components being selected from a group consisting of a network component, a hardware component, and a software component, the method comprising:
   a. collecting data from the components;
   b. analyzing data collected from the components to discover one or more issues in the components, the analyzing step including considering domain knowledge of the components and considering the interrelationships and correlations between components working within the application; and
   c. diagnosing the issues in the components to determine an action plan.

2. The method as recited in claim 1, wherein the collecting step further comprises:
   gathering data directly from at least one of the components.

3. The method as recited in claim 1, wherein the collecting step further comprises:
   gathering data using a helper process for at least one of the components.

4. The method as recited in claim 1, wherein the collecting step further comprises:
   gathering data using an agent process for at least one of the components.

5. The method as recited in claim 1, wherein the analyzing step further comprises:
   testing at least one of the components for at least one threshold value.

6. The method as recited in claim 1, wherein the analyzing step further comprises:
   computing a response time of at least one of the components.

7. The method as recited in claim 1, wherein the analyzing step further comprises:
   comparing a current state of at least one of the components against stored data.

8. The method as recited in claim 1, wherein the analyzing step further comprises:
   determining a state of network traffic.

9. The method as recited in claim 1, wherein the analyzing step further comprises:
   computing a statistical value of at least one component.

10. The method as recited in claim 9, wherein the computing a statistical value step includes a computing step selected from the group consisting of:
    a. computing a minimum value of the data of the component,
    b. computing a maximum value of the data of the component, and c. computing an average value of the data of the component.

11. The method as recited in claim 1, wherein the diagnosing step is activated by an alert created in the analyzing step.

12. The method as recited in claim 1, wherein the diagnosing step is activated by a user request.

13. The method as recited in claim 1, wherein the diagnosing step is activated periodically.

14. The method as recited in claim 1, wherein the diagnosing step further comprises:

defining the scope of the issues in the components.

15. The method as recited in claim 14, wherein the defining step further comprises:

a. analyzing data from the components with issues;
b. analyzing data from the components related to the components with issues;
c. correlating the data from the components with issues and the related components.

16. The method as recited in claim 1, wherein the diagnosing step further comprises:

finding a root cause of the issues.

17. The method as recited in claim 16, wherein the finding step further comprises:

checking if available data is sufficient to find the root cause of the issues; and
firing tasks related to the issues in the components to gather more data, if the available data is insufficient.

18. The method as recited in claim 16, wherein the finding step further comprises:

using expert systems.

19. The method as recited in claim 16, wherein the finding step further comprises:

using case based reasoning and rule systems.

20. The method as recited in claim 16, wherein the finding step further comprises:

modeling differences between systems in time.

21. The method as recited in claim 16, wherein the finding step further comprises one modeling step selected from the group consisting of:

modeling differences between equivalent components that vary by location,
modeling differences between similar components that vary by location, and
modeling differences between abstractions of groups of components that vary by location.

22. The method as recited in claim 16, wherein the finding step further comprises:

comparing instances of a same type of component.

23. The method as recited in claim 16, wherein the finding step further comprises:

baselining with predictive modeling on data to find the cause of the issues.

24. The method as recited in claim 17, wherein the firing step further comprises:

a. filtering relevant tasks from knowledge modules relating to the components with issues; and
b. executing the tasks from knowledge modules relating to analyzers and correlators with issues.

25. The method as recited in claim 1, wherein the taking action plan further comprises displaying the data relating to the root cause of the issues on a GUI.

26. The method as recited in claim 16, wherein the determining an action plan further comprises providing notifying data relating to the root cause of the issues to a user by email.

27. The method as recited in claim 16, wherein the determining an action plan further comprises providing notifying data relating to the root cause of the issues to user by pager.

28. The method as recited in claim 1, wherein the determining an action plan comprises displaying data relating to a recommended solution for repairing the issues in the components on a GUI.

29. The method as recited in claim 1, wherein the determining an action plan further comprises repairing the issues in the components.

30. The method as recited in claim 29, wherein the repairing step further comprises:

a. filtering tasks from knowledge modules for repairing the components with the issues; and
b. executing the tasks from knowledge modules to repair the components with the issues.

31. A computer program product tangibly embodied in an information carrier for holistic monitoring and troubleshooting an application, the application functionally depending upon a plurality of components on a network system, at least one of the plurality of components being selected from a group consisting of a network component, a hardware component, and a software component, the computer program comprising instructions operable to cause a computer system to:

a. collect data from the components;
b. analyze data collected from the components to discover one or more issues in the components, wherein the instructions to analyze data includes instructions to consider domain knowledge of the components and instructions to consider the interrelationships and correlations between components working within the application; and
c. diagnose the issues in the components to determine an action plan.

32. The computer program product as recited in claim 31, wherein collecting data further comprises instructions to:

gather data directly from at least one of the components.

33. The computer program product as recited in claim 31, wherein collecting data further comprises instructions to:

gather data using a helper process for at least one of the components.

34. The computer program product as recited in claim 31, wherein collecting data further comprises instructions to:

gather data using an agent process for at least one of the components.

35. The computer program product as recited in claim 31, wherein analyzing data further comprises instructions to:

test at least one of the components for at least one threshold value.

36. The computer program product as recited in claim 31, wherein analyzing data further comprises instructions to:

compute a response time of at least one of the components.

37. The computer program product as recited in claim 31, wherein analyzing data further comprises instructions to:

compare a current state of at least one of the components against stored data.

38. The computer program product as recited in claim 31, wherein analyzing data further comprises instructions to:

determine a state of network traffic.

39. The computer program product as recited in claim 31, wherein analyzing data further comprises instructions to:

compute a statistical value of at least one component.

40. The computer program product as recited in claim 39, wherein computing a statistical value includes instructions to compute selected from the group consisting of:
 a. compute a minimum value of the data of the component,
 b. compute a maximum value of the data of the component, and
 c. compute an average value of the data of the component.

41. The computer program product as recited in claim 31, wherein diagnosing the issues is activated by an alert created in the analyzing step.

42. The computer program product as recited in claim 31, wherein the diagnosing step is activated by a user request.

43. The computer program product as recited in claim 31, wherein diagnosing the issues is activated periodically.

44. The computer program product as recited in claim 31, wherein diagnosing the issues further comprises instructions to:
 define the scope of the issues in the components.

45. The computer program product as recited in claim 44, wherein defining the scope further comprises instructions to:
 a. analyze data from the components with issues;
 b. analyze data from the components related to the components with issues;
 c. correlate the data from the components with issues and the related components.

46. The computer program product as recited in claim 31, wherein diagnosing the issues further comprises instructions to:
 find a root cause of the issues.

47. The computer program product as recited in claim 46, wherein finding a root cause further comprises instructions to:
 check if available data is sufficient to find the root cause of the issues; and
 fire tasks related to the issues in the components to gather more data, if the available data is insufficient.

48. The computer program product as recited in claim 46, wherein finding a root cause further comprises instructions to:
 use expert systems.

49. The computer program product as recited in claim 46, wherein finding a root cause further comprises instructions to:
 use case based reasoning and rule systems.

50. The computer program product as recited in claim 46, wherein finding a root cause further comprises instructions to:
 model differences between systems in time.

51. The computer program product as recited in claim 46, wherein finding a root cause further comprises instructions to model selected from the group consisting of:
 model differences between equivalent components that vary by location,
 model differences between similar components that vary by location, and
 model differences between abstractions of groups of components that vary by location.

52. The computer program product as recited in claim 46, wherein finding the root cause further comprises instructions to:
 compare instances of a same type of component.

53. The computer program product as recited in claim 46, wherein finding the root cause further comprises instructions to:
 baseline with predictive modeling on data to find the cause of the issues.

54. The computer program product as recited in claim 47, wherein firing tasks further comprises instructions to:
 a. filter relevant tasks from knowledge modules relating to the components with issues; and
 b. execute the tasks from knowledge modules relating to analyzers and correlators with issues.

55. The computer program product as recited in claim 31, further comprising instructions to display the data relating to the root cause of the issues on a GUI.

56. The computer program product as recited in claim 31, wherein the determining an action plan further comprises instructions to provide notifying data relating to the root cause of the issues to a user by email.

57. The computer program product as recited in claim 31, wherein determining an action plan further comprises instructions to provide notifying data relating to the root cause of the issues to user by pager.

58. The computer program product as recited in claim 31, wherein determining an action plan comprises instructions to display data relating to a recommended solution for repairing the issues in the components on a GUI.

59. The computer program product as recited in claim 31, wherein the determining an action plan further comprises instructions to repair the issues in the components.

60. The computer program product as recited in claim 59, wherein repairing the issues further comprises instructions to:
 a. filter tasks from knowledge modules for repairing the components with the issues; and
 b. execute the tasks from knowledge modules to repair the components with the issues.

61. A system for holistic monitoring and troubleshooting applications and components, each application depending upon one or more components, at least one component being selected from a group consisting of a network component, a hardware component, and a software component, the system comprising:
 a. a plurality of first software modules for monitoring and troubleshooting individual components;
 b. a plurality of second software modules for monitoring and troubleshooting one or more groups of components using interrelationships and correlation between components within the group; and
 c. a plurality of data stores for storing data relating to the components.

62. The system as recited in claim 61, wherein at least one component has an attribute selected from the group consisting of a name, a status, a mode, a configuration, a performance, a load, and a capacity.

63. The system as recited in claim 61, wherein the attribute is accessible by other dependant components.

64. The system as recited in claim 61, wherein the first software modules for monitoring and troubleshooting individual components are analyzers.

65. The system as recited in claim 61, wherein the second software modules for monitoring and troubleshooting group of components are correlators.

66. The system as recited in claim 61, wherein one of the first software modules further comprises:
 a. a sensor module collecting data from respective component;
 b. a software module conducting analysis of data received from the sensor module for discovering issues in the component;

c. a diagnosis module diagnosing issues in the respective component; and d. a presentation module displaying data related to the respective component.

67. The system as recited in claim 66, wherein one of the first software modules further comprises:

a software module for testing if a threshold limit has been exceeded.

68. The system as recited in claim 66, wherein the diagnosis module comprises a plurality of knowledge modules.

69. The system as recited in claim 68, wherein the knowledge modules comprise a plurality of tasks.

70. The system as recited in claim 69, wherein each of the tasks comprises a codified knowledge of an expert of a particular domain required for repairing a particular issue related to the component.

71. The system as recited in claim 69, wherein the tasks are grouped together into categories based on a type of issue related with the system.

72. The system as recited in claim 66, wherein the diagnosis module filters out the tasks based on a category of the component.

73. The system as recited in claim 61, wherein one of the second software modules further comprises:

a. a sensor module collecting data from at least one component in a particular group of components;

b. a software module for conducting analysis of data received from the sensor module for discovering any issues in the particular group of components;

c. a diagnosis module for diagnosing and holistic troubleshooting issues in the particular group of components; and d. a presentation module for displaying data related to the particular group of components.

74. The system as recited in claim 73, wherein one of the second software modules further comprises:

a software module for testing if a threshold limit has been exceeded.

75. The system as recited in claim 73, wherein the diagnosis module comprises a plurality of knowledge modules.

76. The system as recited in claim 75, wherein the knowledge modules comprises a plurality of tasks.

77. The system as recited in claim 76, wherein each of the tasks comprises a codified knowledge of an expert of a particular domain required for repairing a particular issue related to the component.

78. The system as recited in claim 76, wherein the tasks are grouped together into categories based on a type of issue related with the system.

79. The system as recited in claim 73, wherein the diagnosis module filters out the tasks based on a category of a particular group of components.

80. The system as recited in claim 73, wherein one of the second software modules uses a finding technique to find a cause of issues in the group of components.

81. The system as recited in claim 80, wherein the finding technique includes expert systems.

82. The system as recited in claim 80, wherein the finding technique includes expert case based reasoning rule systems.

83. The system as recited in claim 80, wherein the finding technique includes modeling and differentiating between systems.

84. The system as recited in claim 80, wherein the finding technique includes baselining with predictive modeling.

85. The system as recited in claim 61, wherein the presentation module displays data using a GUI.

86. The system as recited in claim 61, wherein the presentation module displays an alert using a GUI.

87. The system as recited in claim 80, wherein the presentation module displays a cause of the issues using a GUI.

88. The system as recited in claim 61, wherein the presentation module displays a solution to repair the issues in the particular group of components using a GUI.

89. The system as recited in claim 61, wherein the plurality of data stores include a first data store having a facility for storing information for real time analysis.

90. The system as recited in claim 61, wherein the plurality of data stores include a second data store having a facility for storing information for long-term analysis.

* * * * *